(12) United States Patent
Razack et al.

(10) Patent No.: US 10,005,941 B2
(45) Date of Patent: Jun. 26, 2018

(54) FLEXIBLE PHASE CHANGE MATERIAL COMPOSITE FOR THERMAL MANAGEMENT SYSTEMS

(71) Applicant: ALL CELL TECHNOLOGIES, LLC, Chicago, IL (US)

(72) Inventors: Siddique Ali Khateeb Razack, Darien, IL (US); Mohamed F. Alzoubi, Orland Park, IL (US); Kathryn Cloutier, Glenmount, NY (US); Said Al-Hallaj, Chicago, IL (US)

(73) Assignee: ALL CELL TECHNOLOGIES, LLC, Chicago, IL (US)

( * ) Notice: Subject to any disclaimer, the term of this patent is extended or adjusted under 35 U.S.C. 154(b) by 97 days.

(21) Appl. No.: 15/105,768

(22) PCT Filed: Dec. 17, 2014

(86) PCT No.: PCT/US2014/070740
§ 371 (c)(1),
(2) Date: Jun. 17, 2016

(87) PCT Pub. No.: WO2015/095271
PCT Pub. Date: Jun. 25, 2015

(65) Prior Publication Data
US 2016/0319174 A1    Nov. 3, 2016

Related U.S. Application Data

(60) Provisional application No. 61/917,142, filed on Dec. 17, 2013, provisional application No. 61/921,728, filed on Dec. 30, 2013.

(51) Int. Cl.
| | |
|---|---|
| *C09K 5/06* | (2006.01) |
| *C08L 91/06* | (2006.01) |
| *C08J 5/04* | (2006.01) |
| *C08K 3/04* | (2006.01) |
| *C08K 7/06* | (2006.01) |
| *C08L 101/00* | (2006.01) |
| *C08J 5/24* | (2006.01) |
| *C08J 7/04* | (2006.01) |
| *H01M 2/10* | (2006.01) |
| *H01M 10/6551* | (2014.01) |
| *H01M 10/613* | (2014.01) |
| *H01M 10/655* | (2014.01) |
| *B05D 1/02* | (2006.01) |
| *B05D 1/18* | (2006.01) |

(52) U.S. Cl.
CPC ............... *C09K 5/063* (2013.01); *B05D 1/02* (2013.01); *B05D 1/18* (2013.01); *C08J 5/04* (2013.01); *C08J 5/24* (2013.01); *C08J 7/047* (2013.01); *C08K 3/04* (2013.01); *C08K 7/06* (2013.01); *C08L 91/06* (2013.01); *C08L 101/00* (2013.01); *H01M 2/1094* (2013.01); *H01M 10/613* (2015.04); *H01M 10/655* (2015.04); *H01M 10/6551* (2015.04); *C08J 2383/04* (2013.01); *C08J 2391/00* (2013.01); *C08J 2391/06* (2013.01); *C08J 2483/04* (2013.01)

(58) Field of Classification Search
CPC .......... C09K 5/068; C09K 5/06; C08L 91/06; C08K 3/04; C08K 3/042
See application file for complete search history.

(56) References Cited

U.S. PATENT DOCUMENTS

| | | | | |
|---|---|---|---|---|
| 4,572,864 A * | 2/1986 | Benson | ..................... | C09K 5/00 252/70 |
| 5,202,150 A * | 4/1993 | Benson | ................ | B27K 3/0242 427/376.2 |
| 5,804,297 A * | 9/1998 | Colvin | ..................... | C09K 5/06 428/327 |
| 6,037,032 A * | 3/2000 | Klett | ......................... | B32B 5/18 156/245 |
| 6,468,689 B1 | 10/2002 | Hallaj et al. | | |
| 6,542,371 B1 * | 4/2003 | Webb | .................. | H01L 23/3733 165/185 |
| 6,942,944 B2 | 9/2005 | Al-Hallaj et al. | | |
| 7,235,301 B2 * | 6/2007 | Bacher | .................... | C09K 5/063 428/408 |
| 7,592,398 B1 | 9/2009 | Rye et al. | | |
| 2002/0193028 A1 | 12/2002 | Zuckerman et al. | | |
| 2003/0000486 A1* | 1/2003 | Ott | ........................... | B32B 5/18 123/41.31 |
| 2003/0124318 A1* | 7/2003 | Magill | ...................... | B32B 3/10 428/195.1 |
| 2003/0145447 A1* | 8/2003 | Moseley | .................. | C04B 35/83 29/458 |
| 2004/0069454 A1* | 4/2004 | Bonsignore | ............ | B82Y 30/00 165/104.15 |
| 2004/0084658 A1* | 5/2004 | Ottinger | ................ | C09K 5/063 252/500 |
| 2006/0073377 A1 | 4/2006 | Al-Hallaj et al. | | |
| 2007/0224425 A1* | 9/2007 | Christ | ..................... | C09K 5/063 428/408 |

(Continued)

OTHER PUBLICATIONS

Mhike et al., Thermochimica Acta 527, 2012, 75-82 (Year: 2012).*

*Primary Examiner* — Liam J Heincer (74) *Attorney, Agent, or Firm* — Pauley Erickson & Kottis (57) ABSTRACT

A thermal management composite, comprising a phase change material within a carbon or graphite matrix. The matrix is coated with a polymer coating to improve flexibility. The matrix can be a molded carbon or graphite material or a carbon or graphite cloth.

15 Claims, 9 Drawing Sheets

(56) References Cited

U.S. PATENT DOCUMENTS

| | | | |
|---|---|---|---|
| 2010/0201241 A1* | 8/2010 | Weaver | F21S 48/328 313/46 |
| 2011/0155985 A1* | 6/2011 | Oh | H01L 27/2409 257/2 |
| 2012/0107662 A1* | 5/2012 | Rommler | C04B 35/536 429/120 |
| 2013/0134347 A1* | 5/2013 | Edgar | C09K 5/14 252/62 |
| 2013/0228308 A1* | 9/2013 | Abhari | C09K 5/063 165/104.17 |
| 2013/0264023 A1 | 10/2013 | Hudler et al. | |
| 2013/0265721 A1 | 10/2013 | Strader et al. | |
| 2013/0270476 A1* | 10/2013 | Yang | C09K 5/063 252/74 |
| 2014/0023853 A1* | 1/2014 | Gueret | B01D 53/02 428/323 |
| 2014/0027003 A1* | 1/2014 | Van Eibergen | C09K 5/063 138/137 |
| 2014/0033925 A1* | 2/2014 | Gueret | B01D 53/02 96/115 |
| 2014/0150464 A1* | 6/2014 | Bloedow | F25D 11/006 62/3.62 |
| 2014/0202541 A1* | 7/2014 | Oxley | C09K 5/063 137/1 |
| 2015/0043161 A1* | 2/2015 | Nelson | G06F 1/206 361/679.54 |
| 2015/0221863 A1* | 8/2015 | Song | H01L 45/06 257/4 |
| 2015/0291868 A1* | 10/2015 | Rajagopalan | C09K 5/14 442/59 |

* cited by examiner

FIG. 3

PCM Composite relaxing and regaining original shape after a few seconds

FLEXIBLE PHASE CHANGE MATERIAL COMPOSITE FOR THERMAL MANAGEMENT SYSTEMS

BACKGROUND OF THE INVENTION

Field of the Invention

This invention is directed to phase change material/graphite matrix composites that are widely used in thermal management battery systems, and more particularly to a phase change material/graphite matrix composite material that is compressible and flexible, and that can withstand mechanical stresses without breaking apart or losing thermal contact with cells Discussion of Related Art Phase change materials (PCM) are widely used in thermal management systems such as those used in lithium ion (Li-ion) batteries. Al-Hallaj et al. disclose using PCM in thermal management of battery system in U.S. Pat. Nos. 6,468,689 and 6,942,944, herein incorporated by reference. PCM is usually impregnated inside pores of graphite matrix surrounding Li-ion cells. The heat released by Li-ion cells is conducted away by the graphite matrix to the PCM. The PCM absorbs large amount of heat close to its phase transition temperature thereby stabilizing and controlling battery temperature to safe operating limits.

The PCM containing graphite matrix mentioned in the above Patents has a few drawbacks and limitations because of material composition of the graphite matrix. Graphite matrix generally has low electrical resistivity which is not desirable because it can cause electrical short-circuit between battery cells. Graphite matrix composite also generally has poor mechanical characteristics such as has low mechanical yield strength, brittleness, being inflexible, and being a non-compressible material. These mechanical characteristics can be important for Li-ion battery applications, such as for prismatic and pouch cells usage that exert mechanical stress on the graphite matrix composite because of their continuous expansion during charging and discharging cycles. Prismatic cells (or pouch cells) are being widely used in many high power and high energy density applications because they have high energy and power density, but they usually expand and contract during charging and discharging cycles. Thus, there is a continuing need for improvement in the graphite matrices, in both thermal properties of the composite, such as thermal conductivity and latent heat, and for the mechanical properties, such as material strength, flexibility and resiliency.

SUMMARY OF THE INVENTION

An object of the invention is to improve flexibility and/or compressibility in PCM composites. The object of the invention can be attained, at least in part, through a thermal management composite including a carbon or graphite matrix and each of a phase change material and a polymer material on and/or within the matrix. The matrix can be embodied, for example, as a molded composite or a woven and/or nonwoven fibrous (e.g., cloth) composite. The phase change material is desirably dispersed within or throughout the matrix, such as disposed in voids between fibers or bundles of fibers of the matrix. A polymer material can be dispersed throughout the matrix as well and/or desirably applied as a coating to the molded or cloth matrix.

The invention further includes a method of making a thermal management composite of this invention. The method includes impregnating a carbon or graphite matrix with a phase change material, either fully dispersed or localized, and then coating at least one side, and desirably all sides, of the impregnated matrix with a polymer coating. The coating can optionally include additives, such as carbon or graphite powders or fibers. Dip coating and/or spray coating can be used to apply the phase change material and/or the polymer coating. Embodiments of the method further include mixing the phase change material with a polymer material and a carbon or graphite material to obtain a matrix mixture, molding the mixture into a molded matrix, and coating at least one side of the molded matrix.

Other objects and advantages will be apparent to those skilled in the art from the following detailed description taken in conjunction with the appended claims and drawings.

BRIEF DESCRIPTION OF THE DRAWINGS

FIG. 4 shows images of carbon cloth, with FIG. 4A being woven carbon cloth, FIG. 4B being knitted carbon cloth at a microscopic resolution, and FIG. 4C being woven carbon cloth at a microscopic resolution

DETAILED DESCRIPTION OF THE INVENTION

This invention is in response to the above mentioned mechanical and thermal limitations and shortcomings of phase change material (PCM) composites and provides enhanced properties for carbon/graphite matrices, such as providing higher thermal conductivity and also imparting higher mechanical strength and structural integrity to support the PCM composite, which results in having good flexibility and compressibility to withstand mechanical stresses.

The invention includes modifying a material composition of graphite composite by adding/mixing a polymer material within the composite matrix and/or including an outer coating containing a polymer material. The base composite contains PCM, graphite, and, optionally, a polymer material binder as primary ingredients. The outer coating contains a polymer material as a primary ingredient, along with any optional and desirable additives, such as graphite powder and/or fibers. Together, a final composite including the base composite material and outer coating material enhances mechanical properties, electrical resistivity, and/or reduces PCM leakage.

The invention provides a PCM composite that is compressible and flexible and that can withstand higher mechanical stresses without breaking apart or losing thermal contact with cell. The invention includes a PCM composite that can be made in thin layers and/or wrapped or wound around prismatic cells. The invention also includes a PCM composite material that can be thermally bonded to improve thermal contact.

Flexibility and compressibility of the PCM composite of this invention for battery thermal management applications addresses current PCM composite mechanical strength limitations. The PCM composite will provide new market applications specifically in Li-ion pouch cells that require use of thin PCM composite slabs. PCM composite slabs according to embodiments of this invention can also be used in prismatic cell industrial applications such as those in airplanes, automotive, and ships.

The invention includes a PCM composite including a PCM, thermal conductive fillers, and a polymer material in various weight proportions to achieve high latent heat, high thermal conductivity and good mechanical strength, flexibility, resilience, compressibility. The PCM composite can have latent heat of >100 J/g for thermal management applications such as in battery, heat storage and release systems. The PCM composite can also or additionally have high thermal conductivity for thermal management applications such as in battery, heat storage and release systems. The PCM composite can have high electrical resistivity, such as >100 Ω·m, to reduce or eliminate electrical short between battery cells in battery applications. The PCM composite can have high mechanical flexibility, resiliency, compressibility, and/or compressive strength, to withstand mechanical stresses.

The invention includes a phase change material, which has predefined melting temperatures for different applications, such as optimum battery operations energy storage systems. The percentage weight of the PCM is between 30 to 80% in the composite material. The PCM can include more than one type of phase change material with different melting temperatures in order to regulate battery temperature at different temperatures such as cold temperature, normal temperature, high temperature for thermal runaway prevention, etc. In one embodiment of this invention, a PCM composite is sandwiched between cells to absorb heat released by cells and also to release some heat to cells. The invention also includes a PCM matrix configurable with holes or slots to insert cells into a composite matrix. The PCM material of this invention includes all forms of phase change material, such as paraffin wax (widely used), vegetable based wax, etc., with different phase transition temperatures. The PCM material can also be polymer encapsulated according to known methods.

The PCM can be used with any suitable matrix material. Exemplary matrix materials include carbon or graphite materials. In embodiments of this invention the matrix can be molded into any suitable form. In another embodiment the matrix is a carbon cloth. The PCM can be applied to and/or within the matrix in any suitable way, such as by dip or spray coating. In embodiments of this invention, the phase change material is dispersed throughout the molded composite. A polymer material, such as polymers described for the coatings herein, can also be dispersed through the matrix as a binder material.

Figure 1:
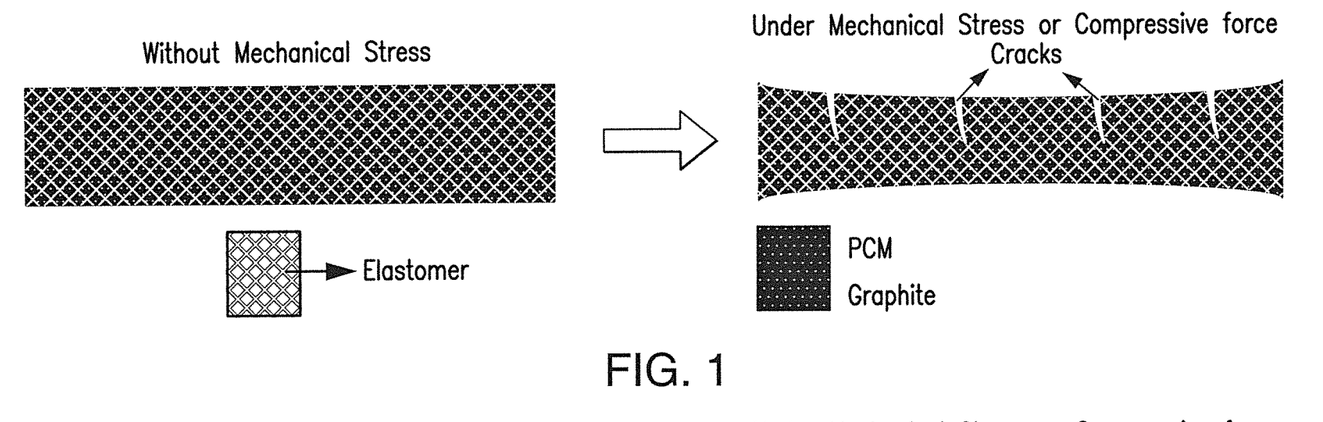
FIG. 1 representatively illustrates the effect of mechanical stress on a high PCM loaded composite without a protective coating of this invention.

FIG. 1 shows a schematic of a representative molded composite containing very high loading of PCM (>40%) and elastomer binder and graphite. The PCM composite cracks under fairly low mechanical stress because the polymer binder (an elastomer preferably) cannot resist the stress because it is present in low loadings in comparison to PCM.

Figure 2:
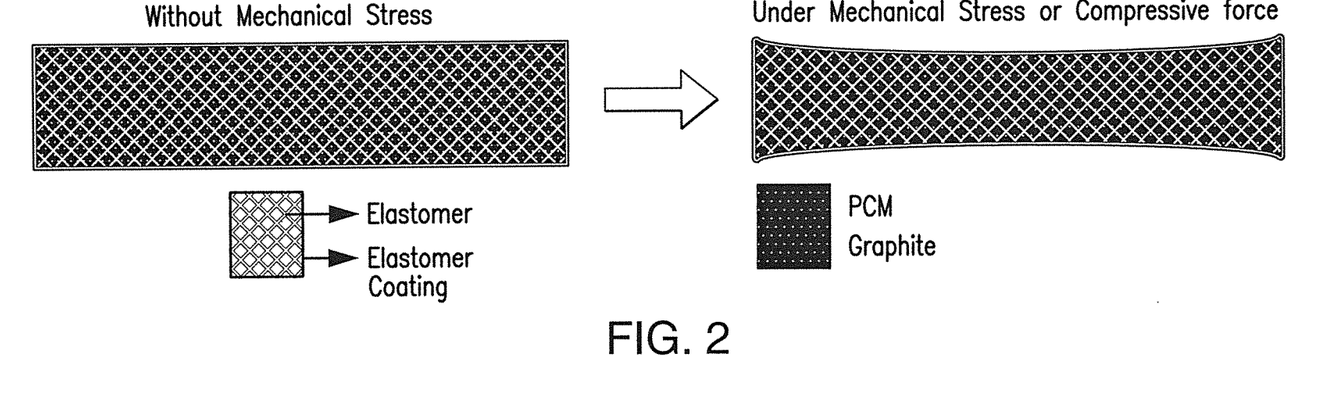
FIG. 2 representatively illustrates the effect of mechanical stress on a high PCM loaded composite with a protective coating according to one embodiment of this invention.

Embodiments of this invention include a polymer material or polymer composite coating on an outside of the PCM containing matrix that absorbs mechanical stress, imparts mechanical flexibility, resiliency, compressibility to the PCM composite and also prevents the PCM composite from breaking under mechanical stress. FIG. 2 shows a schematic of a PCM composite containing high loading of PCM (for high latent heat), graphite (for high thermal conductivity) and polymer (like silicone, EPDM, etc. for flexibility, resilience, compressibility). This matrix is coated with a polymer material and graphite mixture on the outside. The polymer coating can include thermal conductivity enhancing fillers such as graphite powder, graphite fibers, milled fibers, carbon black, carbon nanotubes, metal oxides, metal powder, and/or polymer material to enhance electrical resistivity, mechanical strength, flexibility, resiliency, and/or compressibility. The polymer composite coating can include thermal conductivity enhancing fillers in a weight ratio of, for example, 5 to 50%. The coating composition preferably, but not necessarily, has the same polymer and graphite as in the base PCM composite to which coating is applied. The optional inclusion of the graphite can be used to tailor coating characteristics. The amount of graphite and polymer weight ratio in the coating composition can be determined by how much thermal conductivity, electrical resistivity, flexibility, resilience and/or compressibility is required. For example, if high thermal conductivity is required, more graphite will be used in coating composition; if high electrical resistivity and/or flexibility, resilience, compressibility are desired, more polymer will be used in coating composition.

One exemplary polymer material is an elastomer compound that can be added in varying weight fractions to achieve certain degree of mechanical strength, flexibility, resiliency and compressibility. Many elastomeric compounds exist today and are widely used in rubber industries. Exemplary elastomeric polymers include PDMS silicone, polyurethane, EPDM rubber, EPM, polystyrene, polyisoprene, polyacrylate, SBS rubber, neoprene rubber, butadiene rubber etc. The composition of the elastomeric polymer material can be 5 to 50% in the composite material. Usually these materials are mixed with various fillers such as carbon black, curing agents, flame retardant fillers, etc., to achieve desired properties in elastomer. For sake of simplicity, the primary elastomer compound and all optionally included various filler materials will be referred to generally as the elastomer compound. The elastomer compound can be used in the form of dry powder or liquid.

The coating composition will be determined by the thermal conductivity, electrical resistivity, mechanical flexibility, resiliency, and/or compressibility requirements depending on the desired application. In one embodiment of this invention, the coating composition includes, without limitation, about 0-90% graphite/carbon and 10-100% elastomer compound, more desirably about 0-50% graphite/carbon and 50-100% elastomer compound, and preferably about 0-30% graphite/carbon and 70-100% elastomer compound. The graphite/carbon and elastomer compound(s) used in the coating composition are preferably the same type(s) used in the PCM composite to which this coating will be applied. Depending on the coating solution viscosity, the coating can be either applied by dip coating or spray coating the PCM composite, or other widely used coating deposition techniques.

In other embodiments of this invention, the polymer coating is applied as a polymer film, applied or laminated to the carbon matrix. The film can be a polymer adhesive film that is thermally bonded or pressed on at least one surface of the composite matrix. Suitable adhesive polymer films are available commercially as a pure polymer form or filled with thermal conductive fillers to enhance thermal conductivity.

Figure 3:
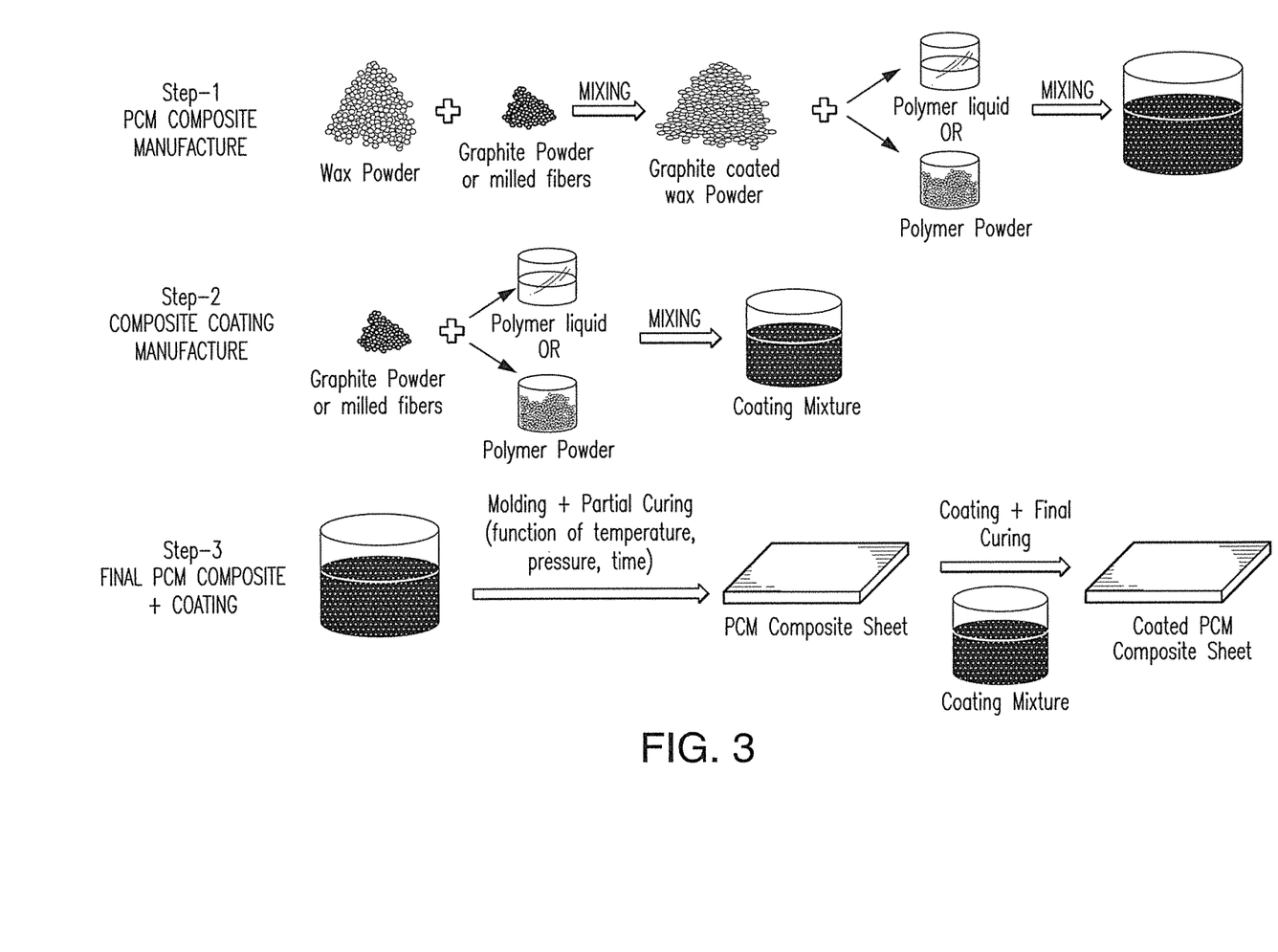
FIG. 3 illustrates a method of manufacturing a PCM composite material according to one embodiment of this invention.

FIG. 3 shows a schematic of one method to manufacturing a PCM composite material having a polymer coating. There are many methods of manufacturing a PCM composite material and anyone skilled in art of composite manufacture is well aware of various manufacturing techniques. Compression and injection molding are very commonly used manufacturing techniques in the rubber and polymer industry.

Various PCM composites were manufactured successfully at high PCM loadings greater than 30% by weight by coating the composites. In one embodiment of this invention, as shown in FIG. 3, there are basically three steps in the manufacture of a coated PCM composite. Referring to FIG. 3, in step one, the PCM material is mixed with graphite in powder form. Although liquid PCM can also be used, using dry powder mixing makes the process easy to control with less complication. The PCM and graphite powder blend is ground to fine particle size, preferably <1 mm and mixed together very well. The PCM composite is then transferred into a mold of suitable dimensions. The molding can be done at elevated temperature and pressure to get a uniform mixture and also to melt the polymer or elastomer if solid elastomer is used. The final PCM composite can be partially or fully cured before the polymer coating is applied. Preferably, it should be partially cured so that complete curing occurs after polymer coating has been applied to form strong adhesion between the coating and PCM composite structure.

Step two includes the manufacture of the polymer coating. In this step, graphite powder, if or as needed, is mixed with elastomer compound containing any optional various additives (either powder or liquid form). After thorough mixing, the coating formulation is poured into a bath for dip coating or the mold can be coated with coating formulation before transferring the PCM composite into the mold. The mixing can be performed at below or above the glass transition temperature of the polymer or elastomer used.

In step three, the PCM composite is molded into final form after it has been coated in the previous step with the polymer coating. The molding is usually done at high temperature and compression pressure, except for a few polymers like silicone that can also be molded at room temperature.

In one embodiment, the invention includes PCM impregnated into the pores of a matrix formed from a carbon/graphite fiber cloth which is flexible and compressible. The matrix comprises phase change material disposed in voids between the fibers or bundles of the fibers, and wherein the matrix can be wrapped around one or more battery cells.

Embodiments of this invention further include a polymer coating applied to the carbon/graphite fabric PCM composite. This polymer coating enhances the mechanical properties of the carbon/graphite fabric PCM composite by increasing flexibility, compressibility of final composite, imparting mechanical resiliency, increasing electrical resistivity to prevent electrical short between cells in a battery pack, and/or reducing or eliminating PCM leakage, particularly if non-microencapsulated PCM is used.

Figure 4A:
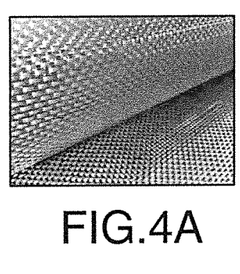
Figure 4B:
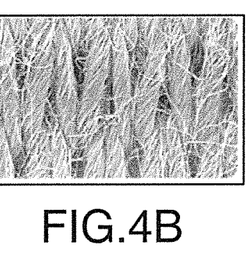
Figure 4C:
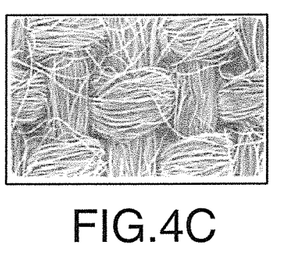

FIG. 4A shows an image of a woven carbon cloth, and FIGS. 4B and 4C show the microscopic structure of knitted and woven carbon cloths, respectively. The microscopic structure shows the individual fibers of carbon cloth drawn together to create a very strong mechanical structure. In embodiments of this invention, the voids present in-between the individual fibers and between the fiber bundles are filled with PCM. The surface area of carbon cloth can be very high, ranging from 10 $m^2$/gm to 2000 $m^2$/gm, depending on the quality and the structure of carbon cloth from different manufacturers. Thus, it has a big potential to fill huge amount of PCM per unit weight or volume of carbon cloth.

The PCM material of this invention can include various and alternative forms and combinations of phase change materials, such as described above. Depending on the carbon cloth density, the PCM weight fraction varies. In one embodiment of this invention, the PCM carbon cloth of this invention includes about 30 to about 95% PCM and about 5 to about 70% carbon/graphite cloth, and more desirably about 50 to about 95% PCM and about 5 to about 50% carbon/graphite cloth.

In one embodiment of this invention, it is preferable to add at least one polymer material, such as described above, coating the cloth with the applied PCM and/or to soak into the carbon cloth. The addition of the polymer material provides an additional binding of PCM to carbon cloth fibers and also improves adhesion. The coating composition will be determined by the electrical resistivity, mechanical flexibility, resiliency, and compressibility requirements, depending on the desired application. In one embodiment, the coating composition includes about 0 to 90% graphite/carbon and about 10 to 100% elastomer compound. As described above, depending on the coating solution viscosity, the coating can be either applied by dip coating the PCM composite or spray coating or other widely used coating deposition techniques.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

PCM Composite with Coating

A PCM composite with an elastomer coating was manufactured according to above explained manufacturing process. The composition of the PCM composite and the elastomer coating was as follows.

PCM Composite Composition:
PCM Type: paraffin wax with melting point of 55° C.
Graphite Type: Superior Graphite™ powder
Polymer Type: Dow Corning™ Sylgard 184® elastomer—PDMS (Polydimethyl siloxane)
PCM Wt %=55%
Graphite Wt %=20%
PDMS Wt %=25%
PDMS: curing agent=10:1

Coating Composition:
Graphite weight %=40%
PDMS weight %=60%
Manufacturing Steps:

55 g of PCM powder and 20 g of graphite were mixed together in a commercial home mixer until a uniform blend was achieved. 25 g of PDMS silicone resin and curing agent in ratio of 10:1 were mixed together using a spatula and were also put inside a vacuum oven to remove air-bubbles. The PCM and graphite blend were poured into the PDMS resin liquid and they were hand mixed using a spatula. The coating formulation was prepared by mixing 40 g of graphite powder and 60 g of PDMS silicon resin using a spatula to create a uniform blend. A rectangular mold was obtained and the inside of the mold cavity was coated with (graphite+ PDMS) coating formulation as a thin layer. The PCM composite blend was poured into the rectangular mold and pressed to fill the mold cavity completely. The coating formulation was applied on top of the PCM composite in the mold cavity. The thickness of coating layer was controlled to obtain sufficient flexibility, resilience, and compressibility in the coating layer. The mold was then cured at high temperature of about 160° F. for 2-3 hours (the higher the temperature, the faster the curing of the elastomer). After curing, the final PCM composite was removed from the mold. The final PCM composite weight was measured to calculate the density.

Figure 5:
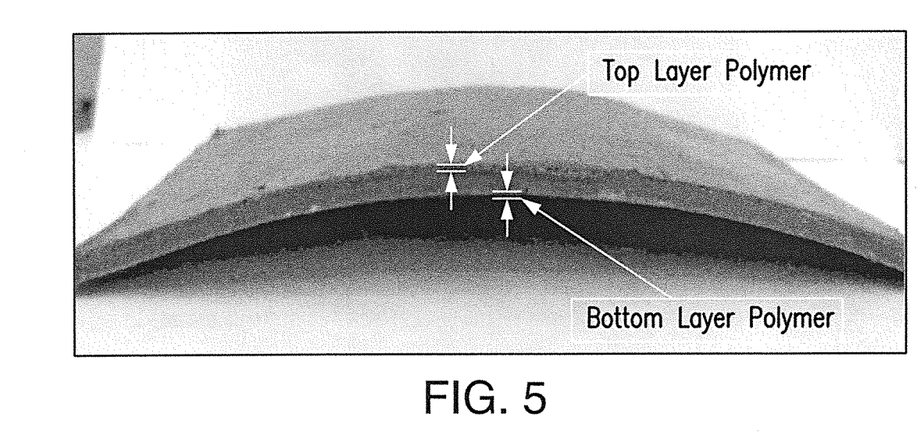
FIG. 5 illustrates an elastomer coated flexible PCM composite according to one embodiment of this invention.
Figure 6:
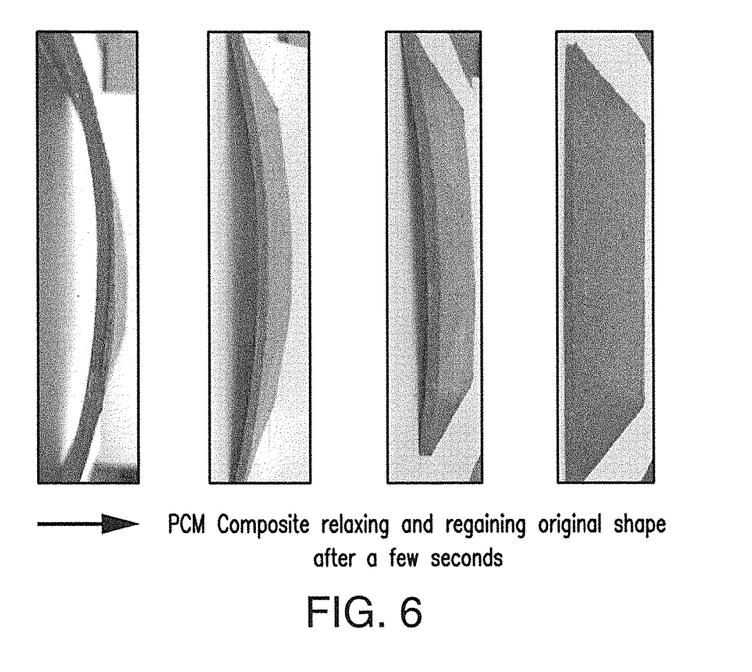
FIG. 6 shows the flexibility and relaxation of the elastomer coated flexible PCM composite of FIG. 5

FIG. 5 shows the resulting PCM composite with the coating. The coating is clearly visible in FIG. 5. In FIG. 6, a mechanical stress was applied to the same elastomer coated PCM composite by simply bending the sample and the sample was allowed to relax to a planar state after removing the stress. The evolution of relaxation is shown in FIG. 6. After few seconds, the PCM composite completely recovered and returned to its original form. This property is very important in some applications, such as Li-ion battery pouch cells, where the cells constantly expand and contract during charge and discharge cycles. The PCM composite will thus be able to make thermal contact with Li-ion pouch cell continuously.

Figure 7:
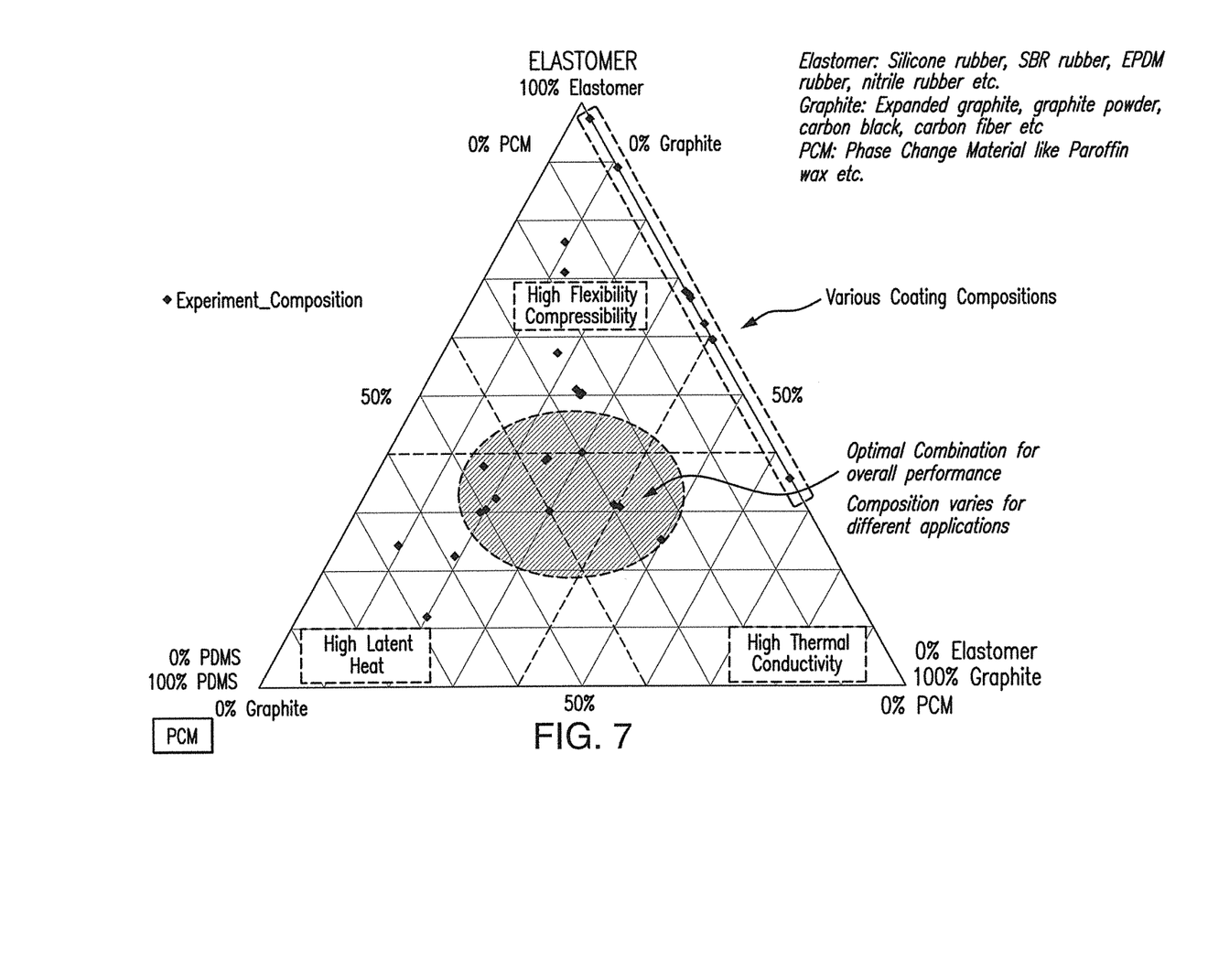
FIG. 7 graphically illustrates compositions of PCM composite material and elastomer coatings according to embodiments of this invention.

FIG. 7 shows various compositions of PCM composite samples that were produced during experimental trials. Optimal composition balancing heat storage, thermal conductivity, and mechanical properties is highlighted in the dashed circle. Different battery applications have different material requirements and appropriate composition can be developed by varying the ratios of the PCM, graphite or polymer to meet desired thermal conductivity, electrical resistivity, flexibility, resilience, compressibility. Various coating compositions used in the experiments and are identified in the FIG. 7 by the dotted line box along the triangle edge.

Figure 8:
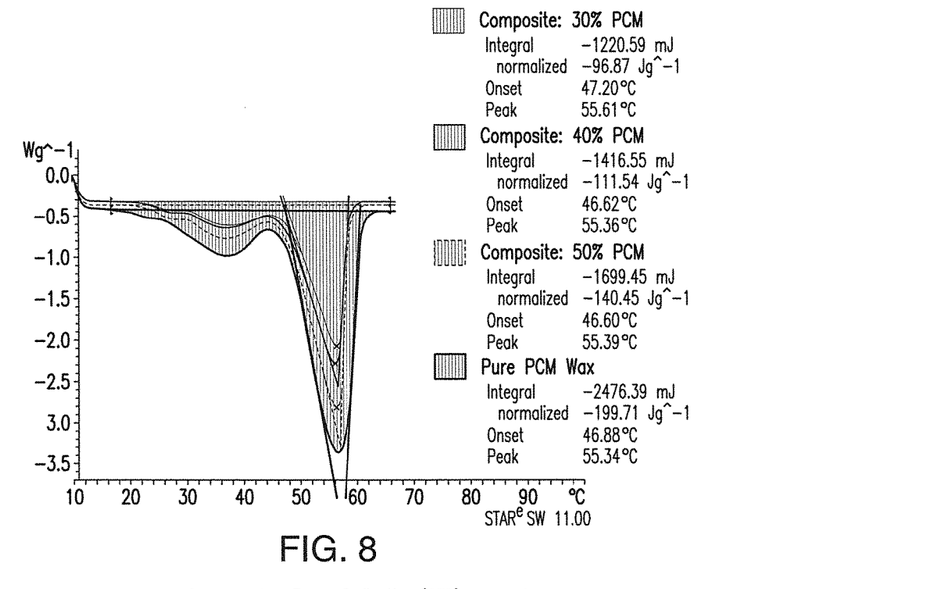
FIG. 8 shows differential scanning calorimetry (DSC) results comparing enthalpy of melting for a control sample without elastomer and composite materials with elastomer according to embodiments of this invention.

The enthalpy of melting (latent heat) of a control sample without elastomer and a PCM composite with elastomer was measured using differential scanning calorimetry (DSC). FIG. 8 shows DSC curves for pure wax and the polymer PCM composite containing various weight % of PCM in the composite. Depending on the amount of PCM, the latent heat of the PCM composite material reduces proportionately. Also, the new PCM polymer composite is very similar in shape compared to pure wax indicating no chemical reaction between the polymer (PDMS elastomer) and the PCM.

Table 1 shows the electrical resistivity of polymer coated PCM composite material. The electrical resistivity varies as a function of coating weight % and thickness. Without the polymer, the electrical resistivity of PCM and graphite matrix alone is about 0.1 to 0.4E-03 Ω·m which is about 5-6 orders of magnitude lower than the coated PCM composite. Thus, the electrical resistivity is greatly increased, which can prevent electrical short circuits between cells. If only a PCM/graphite material is used, an additional electrical insulation layer needs to be placed between the battery cell and PCM/graphite material to prevent electrical shorts between battery cells.

TABLE 1

Electrical Resistivity of Polymer coated PCM composite

| Coated PCM Composite | Electrical Resistivity (Ω · m) | Approximate Coating Wt % of PCM Composite | Coating Thickness |
|---|---|---|---|
| 1 | 1.39E+02 | 5-20% | Less |
| 2 | 4.26E+02 | 5-20% | |
| 3 | 5.89E+02 | 5-20% | |
| 4 | 6.39E+02 | 5-20% | More |

Mechanical Compression

Figure 9:
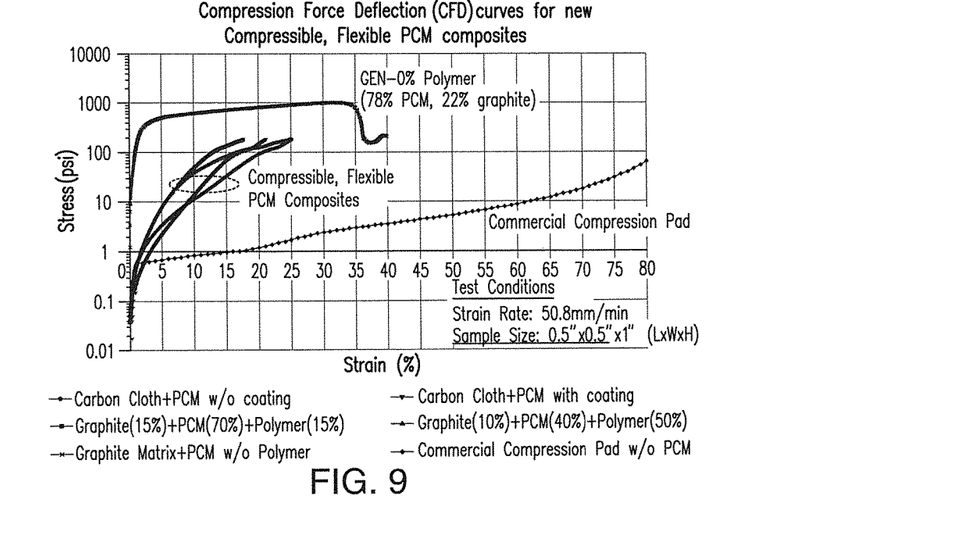
FIG. 9 summarizes mechanical compression testing of a control PCM composite (graphite matrix: 20%, PCM: 80%) and a flexible PCM composites made according to embodiments this invention.

Table 2 and FIG. 9 summarize mechanical compression testing of a control PCM composite (graphite matrix: 20%, PCM: 80%) and a flexible PCM composites made according to this invention. A commercial compression pad is also shown for comparison purpose. The compression testing included compression at a strain rate of 2 inches/min. The resulting force was measured and stress was calculated from the sample area. Very stiff materials required very high force to cause a deflection (strain) whereas very resilient, soft materials required less force to cause a deflection (strain).

Table 2 lists the samples created for comparative testing of mechanical compression, along with measured results. The PCM composite without polymer (sample 1) and including a graphite matrix (20%) required about 200 psi to cause a 1% strain in the material where a commercial pad required only 2 psi for a 25% strain (compression deflection). The compressible PCM composite materials according to this invention (samples 3-6) showed a stiffness that was in between the compression pad and original PCM composite. With further optimization, the correct balance of PCM, graphite, and polymer can be achieved to meet the needs of thermal and mechanical requirements that will provide the latent heat requirements and compression requirements needed in a pouch cell or applications requiring flexible thermal management component.

TABLE 2

| No. | Sample | Core Composition | Coating Composition | Compression Force/Strain |
|---|---|---|---|---|
| 1 | PCM Composite - Non flexible (PCM: 80%, Graphite: 20%) | PCM: 78% Expanded Graphite: 22% | None | 1% strain @ 200 psi |

TABLE 2-continued

| No. | Sample | Core Composition | Coating Composition | Compression Force/Strain |
|---|---|---|---|---|
| 2 | Commercial Compression Pad | Silicone Foam | None | 25% Strain @ 2 psi |
| 3 | New PCM Composite with polymer coating | PCM: 70% Graphite powder: 15%, Silicone Polymer: 15% | Graphite powder: 40% Silicone Polymer: 60% | 5% Strain @ 10 psi |
| 4 | New PCM Composite with polymer coating | PCM: 70% Graphite powder: 15%, Silicone Polymer: 15% | Graphite powder: 40% Silicone Polymer: 60% | 5% Strain @ 10 psi |
| 5 | New Carbon Cloth PCM Composite - without Polymer coating | PCM: 60% Carbon Cloth: 40% | None | 10% Strain @ 11 psi |
| 6 | New Carbon Cloth PCM Composite - with Polymer coating | PCM: 60% Carbon Cloth: 40% | Graphite powder: 40% Silicone Polymer: 60% | 10% Strain @ 10 psi |

Carbon Cloth-PCM Composite

A small piece of carbon cloth was cut out and soaked in liquid paraffin wax PCM with a melting temperature of 55° C. The soaking was conducted at 75° C. and −75 kPa in a vacuum oven for one hour.

Experimental Details:
Carbon cloth dimensions: 10 cm×10 cm
PCM soaking conditions: soaked at 75° C., −75 kPa vacuum for 1 hour
Weight before soaking=3.68 gm
Weight after soaking=8.86 gm
Weight % of PCM=58.5%

The above sample was cut into two halves and one piece was coated with a polymer/graphite mixture to prevent any PCM leakage and also to increase electrical resistivity to prevent electrical short when used with Li-ion cell. The coating composition is listed below. The coating was applied using a spatula on all sides of carbon cloth containing PCM.

Coating Composition:
Graphite powder-Superior Graphite=4 gms
PDMS solvent+curing agent (Dow Corning Sylgard 184)=6 gms Thermal Soaking Test:

The carbon cloth samples with and without polymer coating were put inside a thermal oven maintained at 65° C. The melting temperature of PCM inside the carbon cloth was 55° C. and thus the PCM was melted completely and if the pores of carbon cloth were big enough, the PCM should leak out. If the polymer coating is effective, the PCM weight loss should be very minimal or negligible depending on the coating thickness.

Figure 10:
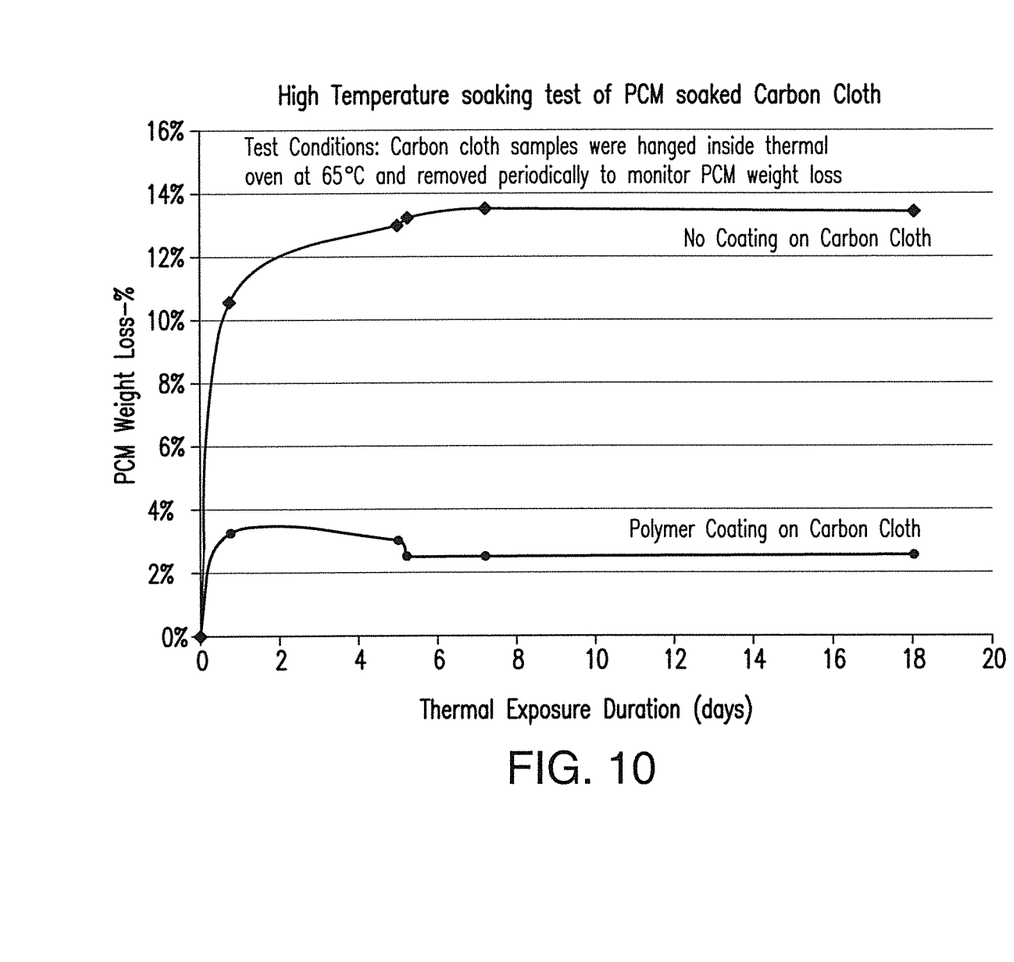
FIG. 10 summarizes high temperature soaking test results for PCM impregnated carbon cloth samples.

The carbon cloth initially had about 58.5 wt % of PCM and after exposure at high temperature (>melting temperature of PCM), the weight loss was about 13.5% on carbon cloth without coating. The PCM weight loss remained rather constant after some time, as shown in the results summary of FIG. 10. This suggests that the PCM held in large pores of carbon cloth were easily lost whereas the PCM held inside very microscopic pores or void spaces in between carbon fibers were held tightly. On the other hand, the carbon cloth coated with a polymer/graphite mix showed significant reduction in PCM weight loss in the liquid state. Thus, the polymer coating of this invention was effective in preventing PCM weight loss in liquid state and acted as a barrier for PCM diffusion. By proper optimization of coating composition and coating thickness, the PCM weight loss can be completely prevented. Another advantage was that the coating also increases the electrical resistivity of the final carbon cloth composite. This can reduce or prevent electrical shorts in between the battery cells when used in battery thermal management applications. Without the coating, additional dielectric components have to be assembled in between battery cells and PCM composite to prevent electrical short, because the PCM/graphite composite has a low electrical resistivity.

Figure 11:
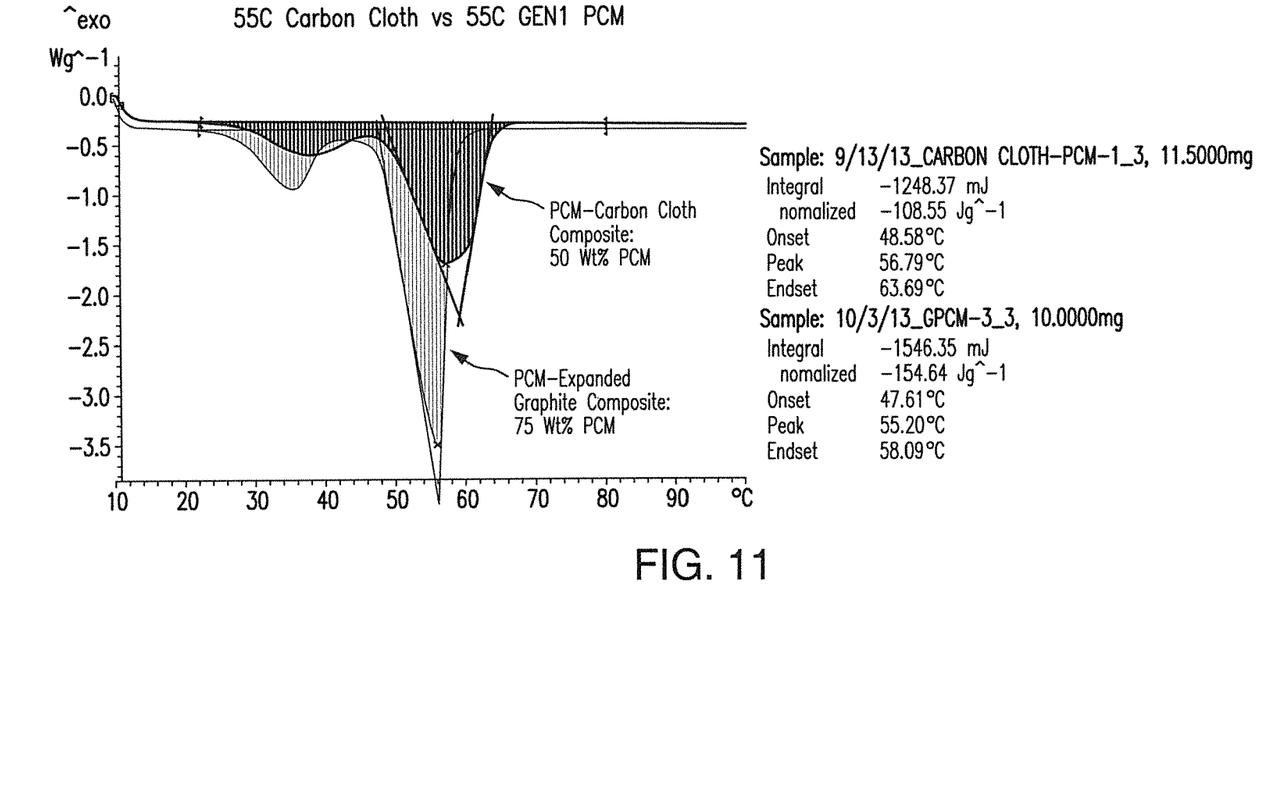
FIG. 11 shows DSC results of carbon cloth/PCM composite made according to embodiments of this invention.

The enthalpy of melting (latent heat) of the carbon cloth/PCM composite was compared with an expanded graphite/PCM composite. The measurement was performed using DSC. FIG. 11 shows the DSC curves for baseline samples: the expanded graphite/PCM composite and the carbon cloth/PCM composite. The PCM weight % in the baseline and carbon cloth composite was 75% and 55%, respectively. Depending on the amount of PCM available in the composite, the latent heat of the PCM composite material reduced proportionately.

High Surface Area Carbon Cloth

Depending on the surface area of the carbon cloth, PCM impregnation can be significantly improved.

PCM Composite:
Carbon Cloth Dimensions: 10 cm×25 cm
Soaking Conditions: 160° F. under vacuum at −50 kPa for 2 hrs
PCM Wt %=75-82%
Carbon Cloth Wt %=18-25%
Coating:
Polymer (PDMS™ Silicone from Dow Corning)=90%
Polymer Curing Agent=10%

Figure 12:
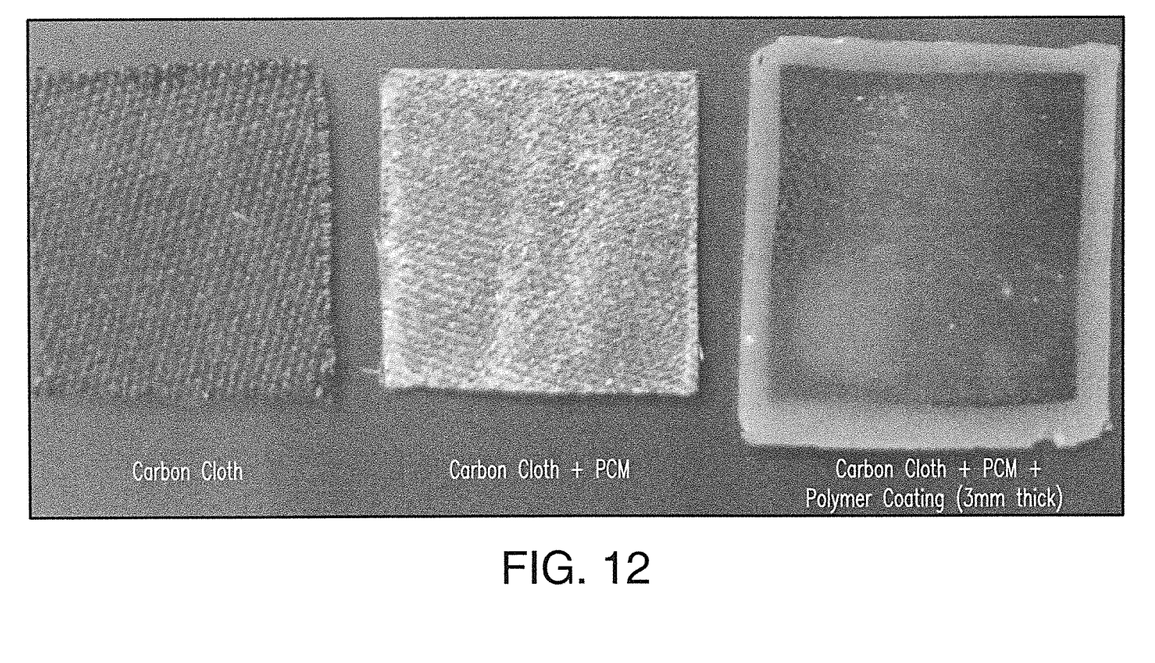
FIG. 12 shows a coated PCM impregnated carbon cloth according to one embodiment of this invention.

A thick polymer coating of about 3 mm, which is similar to a typical compression pad thickness, was applied on the PCM impregnated carbon cloth. The polymer was mixed with curing agent in 10:1 ratio and poured into a small mold. The PCM impregnated carbon cloth was then immersed in the polymer and more polymer was applied to completely cover the carbon cloth composite. The sample was then cured at 160° F. in an oven overnight for >10 hrs. Exemplary samples are shown in FIG. 12, and the latent heat was 145 J/g which is very comparable to the PCM composite without the polymer coating. The outer polymer coating was also soft and resilient, and was very close to meeting the specifications of a commercial compression pad. Further refinements can be made by choice of polymer and/or weight compositions. This example demonstrates that a truly multifunctional PCM composite can be developed that has good thermal energy storage, thermal conductivity, and the mechanical robustness needed to meet battery applications such as pouch cells or thermal energy storage application.

Thus, the invention provides carbon/PCM composite materials with increased compressibility and flexibility, and that can withstand mechanical stresses without breaking apart or losing thermal contact with cells. The carbon cloth/PCM composites of this invention do not need any polymer or elastomer to impart mechanical strength, flexibility, compressibility, thus eliminating the need for additional components, reducing cost, and simplifying manufacturing. The polymer coating prevents PCM leakage, thus reducing or eliminating the need for using microencapsulated PCM and thereby reducing cost. The polymer coating also increases electrical resistivity, thereby reducing or eliminating a need for additional insulating components to be included in the PCM/graphite composite.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A thermal management composite, comprising:
   a carbon or graphite cloth matrix including knitted or woven carbon or graphite fibers;
   a phase change material disposed in voids between the fibers or bundles of the fibers; and
   a polymer coating on at least one surface of the composite, wherein the polymer coating comprises graphite dispersed therein.

2. The composite of claim 1, wherein the matrix is wrapped around one or more battery cells.

3. The composite of claim 1, wherein the carbon or graphite matrix is mixed or impregnated with each of the phase change material and a polymer material.

4. The composite of claim 1, wherein the phase change material comprises a wax.

5. The composite of claim 1, further comprising a microencapsulated phase change material.

6. The composite of claim 5, wherein the phase change material comprises a microencapsulated wax.

7. The composite of claim 1, further comprising the polymer coating on each of a top side and a bottom side of the matrix.

8. The composite of claim 1, wherein the matrix is flexible.

9. A method of making a thermal management composite, the method comprising:
   impregnating a carbon or graphite matrix comprising knitted or woven carbon or graphite fibers with a phase change material; and
   coating at least one side of the impregnated matrix with a polymer coating wherein the polymer coating comprises graphite dispersed therein.

10. The method of claim 9, further comprising dip coating or spray coating the matrix with the phase change material and/or the polymer coating.

11. The method of claim 9, wherein the coating comprises a coating polymer material mixed with carbon or graphite powder or fibers.

12. The method of claim 11, further comprising dip coating or spray coating the matrix with the phase change material and/or the polymer coating.

13. A thermal management composite, comprising:
   a flexible carbon or graphite cloth matrix of carbon or graphite fibers, wherein the cloth is knitted or woven from the carbon or graphite fibers or bundles of the carbon or graphite fibers; and
   a phase change material disposed in voids between the fibers or the bundles of the fibers; and a polymer coating on at least one surface of the composite, wherein the polymer coating comprises graphite dispersed therein.

14. The composite of claim 13, wherein the flexible cloth matrix is configured to wrap around one or more battery cells.

15. The composite of claim 13, wherein the phase change material comprises a microencapsulated wax.

* * * * *